May 23, 1972   TOSHIFUMI IMAI   3,664,749
CONTOUR PROJECTOR HAVING AN OPTICAL SYSTEM WHICH MOVES IN
A VERTICAL DIRECTION TO DETERMINE THE VERTICAL
DIMENSIONS OF A SPECIMEN
Filed April 17, 1970
2 Sheets-Sheet 1

May 23, 1972  TOSHIFUMI IMAI  3,664,749
CONTOUR PROJECTOR HAVING AN OPTICAL SYSTEM WHICH MOVES IN
A VERTICAL DIRECTION TO DETERMINE THE VERTICAL
DIMENSIONS OF A SPECIMEN
Filed April 17, 1970                2 Sheets-Sheet 2

United States Patent Office 3,664,749
Patented May 23, 1972

3,664,749
CONTOUR PROJECTOR HAVING AN OPTICAL SYSTEM WHICH MOVES IN A VERTICAL DIRECTION TO DETERMINE THE VERTICAL DIMENSIONS OF A SPECIMEN
Toshifumi Imai, Kawasaki, Japan, assignor to Nippon Kogaku K.K., Tokyo, Japan
Filed Apr. 17, 1970, Ser. No. 29,526
Claims priority, application Japan, May 9, 1969, 44/35,616
Int. Cl. G02b 9/08
U.S. Cl. 356—164
5 Claims

ABSTRACT OF THE DISCLOSURE

In a conventional contour projector, the accuracy of measurement, particularly for the vertical dimension of an object has been difficult to maintain. This invention provides an improved method for the aforementioned measurement. In this invention, neither the stage nor the whole optical system of the contour projector are moved vertically for the object. On the contrary, measurement of the vertical dimension about the object is carried out by the vertical movement of a part of the whole optical system, that is, the illumination system, projection system, reflecting system, and scale, etc. are moved, in unison, about the object. Therefore the object to be measured is held stationary, and the movement of a light weight moving part assures a higher order of mechanical accuracy. Optical error which is caused by mechanical play is completely eliminated by the selection of suitable construction.

BACKGROUND OF THE INVENTION

The present invention relates to an optical system for contour projectors.

In both the vertical and horizontal optical axis type contour projectors, it is very difficult to obtain and mtain- tain accuracy in displacement of a stage in the vertical direction (z-direction) as compared with the horizontal direction (x and y-directions). Especially in the case of measurement, when an object to be measured is of heavy weight the error in measurement tends to occur more frequently. In the contour projector shown in FIG. 1, a movable member X having a stage upon which is placed an object O (specimen) is moved toward the right or left for inspecting the object O in the x-direction. The other movable member Y disposed immediately below said member X is moved forward or backward in the y-direction or focusing direction of an objective lens L. Both the right and left and the forward and backward movable members X and Y are moved up and down by a so-called stage elevating member Z for vertically moving the stage and the inspection about the z-direction is carried out. When the object O is of a relatively longer length and a relatively heavy weight and is displaced in the x-direction for measuring the length, the object O is displaced first toward the right so that the image O' of the specimen O is projected upon a screen Q so as to align with a cross wire. The position of the specimen O is then read by for example a micrometer. Thereafter the specimen O is displaced toward the left so that the other end thereof is measured in a similar manner as described above. In this case as readily seen from FIG. 1 the vertically movable member Z has an accentric load from both of specimen O and the horizontally movable member X. When there exists no play between the guides of the vertically movable member Z and the sliding members and when the members are made of a perfectly rigid material, there occurs no error in measurement. It is however necessary to provide some play between the guides and the sliding members in order that the vertically movable member Z may move slidably vertically. Furthermore, the stage must be considered as an elastic body made of a metal not as a perfect rigid body. Therefore, large errors occur in measurement with a large-sized contour projector. In case of a small-sized contour projector, an object being inspected is generally of small dimensions so that the errors in measurement due to the plays and the elastic deformations described hereinbefore may be negligible. However, when the object to be inspected is large in size and heavy in weight, and contour projector is large in size the eccentric load is increased to such an extent that accuracy in measurement cannot be maintained There has been proposed a method in which the whole optical projection system instead of the stage is displaced vertically as in the case of a small-sized contour projector. But when this method is employed in a large-sized contour projector, because of the heavy weight of the whole optical projection system, it is increasingly difficult to obtain and maintain the accuracy in measurement.

SUMMARY OF THE INVENTION

In brief, the present invention provides an optical system for a contour projector. In the optical projection path of the contour projector, a first reflecting member which directs the optical projection path to bend at a right angle and second reflecting members for directing back along a U-shaped light path said light reflected by said first reflecting member are so arranged that an objective lens system and said first reflecting member of the optical projection system are capable of displacing in parallel along with said optical axis which is bent at a right angle while they maintain the form of one united body; and said second reflecting members are so arranged as to displace coupled with said objective lens system and said first reflecting member of said optical projection system in the surface which contains said U-shaped optical path along the same direction as that of the displacement of said optical projection system by a distance equivalent almost to one half of the displacement of said optical projection system.

In order to eliminate the errors in measurement caused by the play upon displacement of the objective lens system and the first reflecting member of the optical projection system, the first reflecting member is formed as a penta type and the principal point of the objective lens system of the optical projection system is coincident to the center of rotation of the play caused by the displacement of the objective lens system and the penta type reflecting member of the optical projection system. Alternately, an optical scale reading system is juxtaposed with the optical projection system; the focal length of the optical scale reading system is made equal to that of the optical projection system; and the principal points of both of said optical systems are made in coincidence with each other, whereby a scale fixed to a stationary member of the main body of the contour projector is projected upon a screen.

According to the present invention, the displacement about the vertical direction (z-direction) for the object to be inspected is made by the displacement of a part of the optical system whose light weight remains unchanged, so that a very higher degree of accuracy in displacement of the movable parts can be obtained and maintained and the errors in measurement due to the play upon displacement of the optical system can be eliminated. The heights of the stage and the screen remain unchanged so that the operation is facilitated.

The above and other objects, features and advantages of the present invention will become more apparent from the following description of some illustrative embodiments thereof taken in conjunction with the accompanying drawings.

DESCRIPTION OF THE PREFERRED EMBODIMENTS

Figure 1:
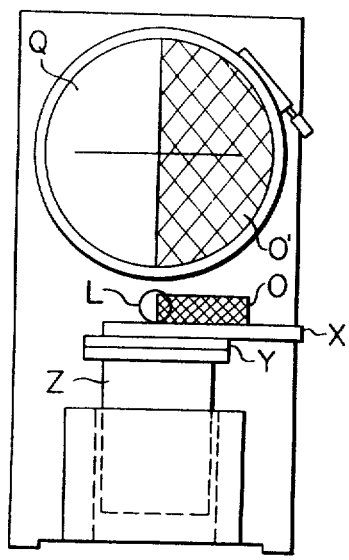
FIG. 1 is a schematic front view of a contour projector of the prior art.

The present invention will be described in comparison with a conventional horizontal optical axis type contour projector as shown in FIG. 1 for the sake of clarity and better understanding.

Figure 2:
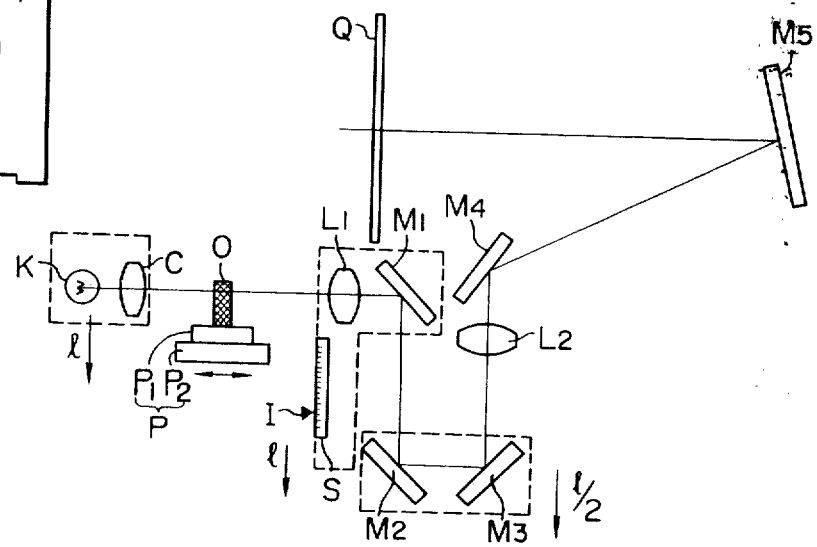
FIG. 2 is a diagrammatic view illustrating a first embodiment of an optical system in accordance with the present invention.

Referring to FIG. 2, the first embodiment of the present invention which eliminates the above described defects encountered in the conventional contour projector will be described. Reference character K designates a light source; C, a condenser lens for illuminating an object O (specimen) being inspected; and P, a stage consisting of an upper member $P_1$ and a lower member $P_2$. The upper stage member $P_1$ is moved in the direction perpendicular to the drawing so as to inspect the specimen O in the x-direction. The lower stage member $P_2$ is moved in the direction indicated by the double-pointed arrow in the Y-direction for focusing the image of the specimen O upon the screen. Reference characters $L_1$ and $L_2$ designate an objective lens and a projection lens, respectively; $M_1$, a first reflecting member; and S, a scale. The projection lens $L_1$, the first reflecting member $M_1$ and the scale S are so arranged as to vertically (in the z-direction) move in unison and the displacement $l$ can be read by an index from the scale S. On the other hand, the illumination system consisting of the light source K and the condenser lens C is so arranged as to vertically move by the same distance $l$ in response to the vertical movement of the projection lens $L_1$, the first reflecting member $M_1$ and the scale S. Second reflecting members $M_2$ and $M_3$ are so arranged that their opposing surfaces form an angle of 90° and that the reflecting members $M_2$ and $M_3$ are moved in unison vertically by a distance equal to $l/2$ in response to the vertical movement of the first reflecting member $M_1$, the projection lens $L_1$ and the scale S.

Reference characters $M_4$ and $M_5$ designate fixed mirrors; and Q, a viewing screen. The back focus of the projection lens $L_2$ is upon the screen Q so that the image forming light bundle between the projection lenses $L_1$ and $L_2$ is a parallel light bundle. Of course, the first reflecting member $M_1$, the second reflecting members $M_2$ and $M_3$ and the fixed or stationary mirrors $M_4$ and $M_5$ are so arranged that the optical axis of the illumination system which is composed of the light source K and the condenser lens C, the projection lenses $L_1$ and $L_2$ and the screen Q are always aligned.

Because of the arrangement of the contour projector in accordance with the present invention, in order to inspect the specimen O in its vertical or z-direction, the assembly of the projection lens $L_1$, the first reflecting member $M_1$ and the scale S is moved vertically in unison with each other while the illumination system consisting of the light source K and the condenser lens C is also moved vertically. This is opposed to the conventional contour projector in which the specimen O is vertically moved, thereby reading the displacement $l$ from the index I and the scale S. In the present case, the light bundle emitted from the projection lenses is a parallel light bundle as described hereinabove and is reflected by the first reflecting member $M_1$ and then by the second reflecting members $M_2$ and $M_3$ and projected upon the screen by the projection lens $L_2$ through the stationary or fixed mirrors $M_4$ and $M_5$. Since the second reflecting members $M_2$ and $M_3$ are so arranged as to displace themselves by $l/2$ in the same direction as that of the displacement of the first reflecting member $M_1$, the length of the light path from the first projection lens $L_1$ to the second projection lens $L_2$ remains unchanged so that the aberrations of the light bundle incident upon the second projection lens $L_2$ are kept unchanged. The second reflecting members $M_2$ and $M_3$ are arranged at 90° relative to each other so that there occurs no out-of-focus image and no error in measurement irrespective of the rotation thereof in the plane of the drawing of FIG. 2.

Figure 3:
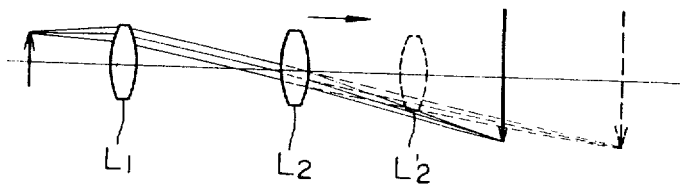
FIG. 3 is an explanation of variation in aberrations of lenses.

It is important that the length of the light path between the first and second projection lenses $L_1$ and $L_2$ remains unchanged. If the length is varied, the height of the light bundle incident upon the projection lens $L_2$, varies as shown in FIG. 3, thereby causing a remarkable variation in the aberration. However, the variation in the aberration may be allowed if it remains within the desired accuracy in measurement so that it is not necessary to precisely displace the second reflecting members $M_2$ and $M_3$ by $l/2$ upon the displacement by $l$ of the first reflecting member $M_1$. In other words, the second reflecting members $M_2$ and $M_3$ may be so arranged as to displace by about $l/2$ in response to the displacement by $l$ of the first reflecting member $M_1$.

Next the error in measurement due to the play when the projection lens $L_1$, the first reflecting member $M_1$ and the scale S are displaced in unison, will be discussed hereinafter. The factors causing the errors in measurement are two. One is the displacement of the projected image due to the inclinations of the projection lens $L_1$, the first reflecting member $M_1$ and the scale S and the other is the error caused by the inclination of the scale S. The errors caused by the latter factor may be negligible when the scale is arranged so as to meet the Abbe's condition, but the first factor greatly affects the accuracy in measurement. This will be discussed in more detail hereinafter. For example, in FIG. 4 assume that the projection lens $L_1$ and, the first reflecting member $M_1$ are caused to rotate about a point T spaced apart from the principal point H of the projection lens $L_1$ by a distance $d$ through a small angle of $\theta$ from the positions shown by the solid lines to the position shown by the broken lines. The principal light bundle A to be projected upon the center of the screen by the projection lens $L_2$ is the light bundle from the point G upon the surface $O_1$ of the object being inspected before the first reflecting member $M_1$ and the projection lens $L_1$ are caused to rotate as described above. In other words, the point G is projected upon the center of the screen. However, when the projection lens $L_1$ and the first reflecting member $M_1$ are rotated through an angle of $\theta$ as described above, to the positions indicated by the broken lines, the principal light bundle A is the light bundle which is inclined relative to the optical axis B at $2\theta$ and is made incident upon the first reflecting member $M_1$. In other words, the point G' is projected upon the center of the screen. The distance between the points G and G' is an error in measurement. To find out the point G', the following relation is established:

$$RG' = f \tan \theta$$

where

R = the intersection between the surface $O_1$ of the object being inspected and the optical axis B' which is inclined at $\theta$ relative to the optical axis B of the projection lens $L_1$; and $f =$ a focal length of the projection lens $L_1$.

Figure 4:
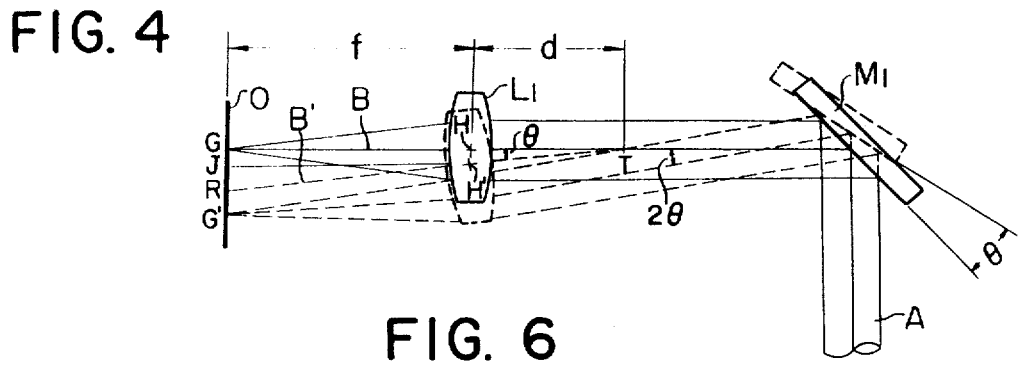
FIG. 4 is an explanation of a play caused upon the vertical displacement of a projection lens and a first reflecting member.

From FIG. 4, $$GR = GJ + JR$$

Since GJ is equal to the displacement HH' of the principal point of the projection lens $L_1$, $$GJ = d \tan \theta \text{ and}$$
$$JR = f \tan \theta$$

Hence, $$GG' = GJ + JR + RG'$$
$$= 2f \tan \theta + d \tan \theta$$

Figure 5:
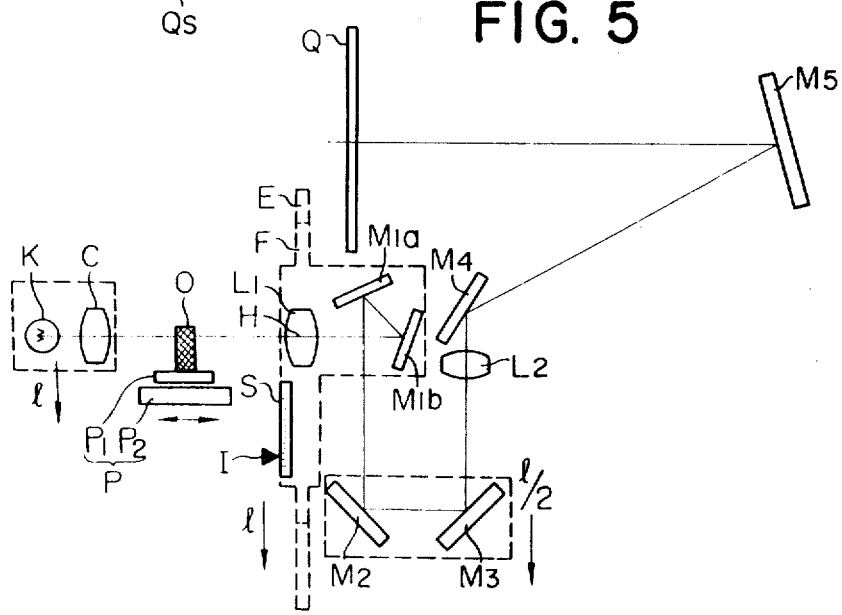
FIG. 5 is a diagrammatic view of a second embodiment of the present invention.

In the second embodiment whose optical system is shown in FIG. 5, the above described error (GG') is optically corrected. In the second embodiment, the first reflecting member $M_1$ of the first embodiment comprises penta type reflecting members $M_{1a}$ and $M_{1b}$. A supporting member F, which supports the objective lens $L_1$, the penta type reflecting members $M_{1a}$ and $M_{1b}$ and the scale S, is vertically moved along a slide guide groove E formed in the main body of the contour projector. The objective lens $L_1$ is so disposed that the principal point H of the lens $L_1$ is in alignment with or above the slide guide groove E. The center of rotation of the projection lens $L_1$, the penta type reflecting members $M_{1a}$ and $M_{1b}$ and the scale the center being caused by the play upon displacement thereof is substantially made in coincidence with the principal point of the projection lens $L_1$. Other arrangements are similar to those of the first embodiment. Therefore, even when the penta type reflecting members $M_{1a}$ and $M_{1b}$ are rotated about the principal point H of the projection lens $L_1$, the angle of reflection of the principal light beam A explained above with reference to FIG. 4 remains unchanged. Furthermore, the projection lens $L_1$ rotates substantially about the principal point H of the projection lens $L_1$ so that the image of the object being inspected, projected upon the screen Q remains unchanged even when the projection lens $L_1$ and the penta type reflecting members $M_{1a}$ and $M_{1b}$ rotate because of the play caused by the vertical movement of them, whereby the errors in measurement can be eliminated. In the instant embodiment, the scale S is integrally formed with the objective lens $L_1$ and the penta type reflecting members $M_{1a}$ and $M_{1b}$. However there will occur no deviation in the scale reading section when the displacement of the projection lens $L_1$ and the penta type reflecting members $M_{1a}$ and $M_{1b}$ are read by a micrometer or the like as in the case of the measurement of the displacement of the stage.

Figure 6:
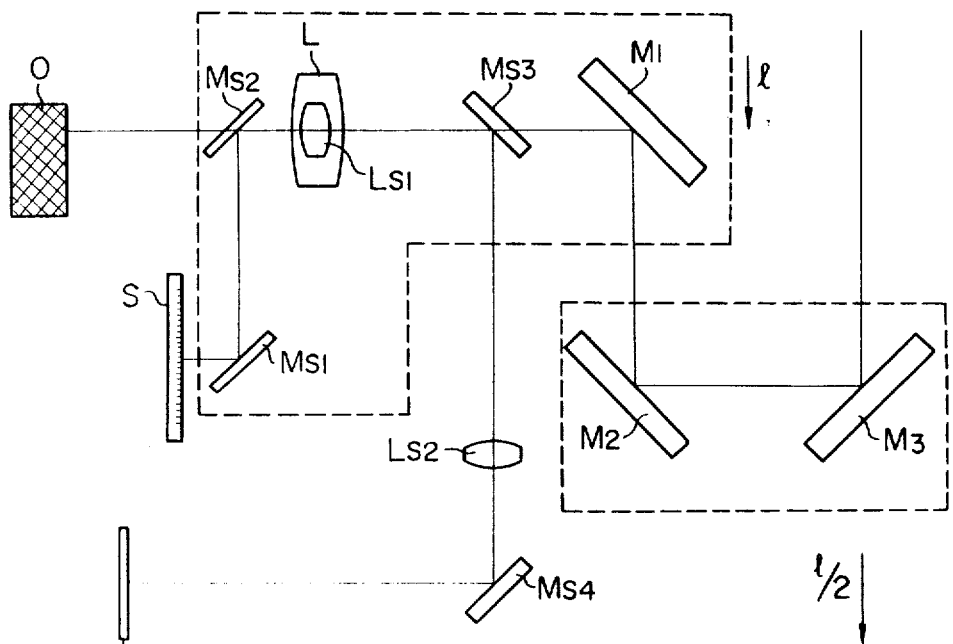
FIG. 6 is a diagrammatic view of a third embodiment of the present invention illustrating only the portion thereof different from the first embodiment.

Next the third embodiment of the present invention will be described with reference to FIG. 6. Except the optical arrangement shown in FIG. 6, the third embodiment is similar to the first embodiment described with reference to FIG. 2. The scale S is disposed to the stationary portion at the focal plane of the reading lens $L_{s1}$ through the mirrors $M_{s1}$ and $M_{s2}$. The mirrors $M_{s1}$, $M_{s2}$ and $M_{s3}$ and the scale reading lens $L_{s1}$ are integrally formed with the members for moving the projection lens $L_1$ and the first reflecting member $M_1$, and the principal point of the scale reading lens $L_{s1}$ is coincident with that of the projection lens $L_1$ and has the same focal length as that of the lens $L_1$. The parallel light rays reflected by the mirror $M_{s3}$ is reflected again by the mirror $M_{s4}$ fixed to the stationary portion so as to be focused upon the screen $Q_s$ by the scale reading lens $L_{s2}$ for reading.

The mirrors $M_{s1}$ and $M_{s2}$ only have the function of reflecting and changing the directions of light so that it may be considered that the arrangement of the instant embodiment is equivalent to placing the scale S directly upon the surface of the object being inspected. As discussed hereinbefore with reference to FIG. 4, when the reading optical system consisting of the mirrors $M_{s1}$, $M_{s2}$ and $M_{s3}$ and the scale reading lens $L_{s1}$ are vertically moved in unison with the measuring optical system consisting of the projection lens $L_1$ and the first reflecting member $M_1$ so that the measuring optical system is rotated through a discrete angle of $\theta$ due to the play, the error in displacement of the center of the screen causes the same difference in reading the scale S so that no error in measurement will be involved. Thus, the rotation about an arbitrary point or the play may be corrected so that the contour projector having a higher degree of accuracy in measurement can be obtained.

The present invention has been so far described with particular reference to the illustrative embodiments thereof, but it will be understood that variations and modifications can be effected without departing from the true spirit of the present invention as described hereinabove and as defined in the appended claims.

What is claimed is:

1. An optical system for a contour projector which comprises:
   an objective lens converting the incident rays thereupon from a fixed specimen to parallel rays, the objective lens being reciprocately movable perpendicularly to the optical axis thereof and vertically with respect to the specimen, said objective lens being moved over the same distance and in the same direction as the light source which illuminates the specimen;
   a first reflection member being provided on said optical axis and being movable integrally with said objective lens to reflect said parallel rays transmitted through the objective lens in the direction of motion of said reflection member;
   second reflection members positioned to reflect the rays reflected by said first reflection member to the reverse and parallel direction, said second reflection members being shifted by one half the distance of the displacement of the objective lens and the first reflection member in association therewith and in the same direction as that of said displacement; and
   a fixed projection lens positioned to transmit to a fixed screen the image of the reflected rays from the second reflected members so that the vertical dimensions of said specimen can be read on a scale.

2. An optical system according to claim 1, in which said objective lens is movable reciprocatingly in the vertical direction and said first reflection member directs the incident rays thereupon to a direction vertical to that of the incident rays.

3. An optical system according to claim 2, further comprising,
   a scale fixedly positioned with respect to said specimen to display the displacement of said objective lens;
   a scale reading lens having the same focal length as that of said objective lens, provided on the same focal plane of said scale; the scale reading lens and the objective lens being arranged on the same horizontal plane and with the same principal point when laterally viewed and being movable with no relative motion;
   a scale reflection member being formed integrally with said scale reading lens to reflect the parallel light rays from the scale reading lens; and
   a projection lens for forming the image from the light rays reflected by said scale reflection member on a second fixed screen.

4. An optical system according to claim 1, in which said first reflection member has two reflection surfaces whereby reflected rays intersect with the rays which are incident on said first reflection member.

5. A contour projector of the type in which the vertical dimensions of a specimen are determined by keeping the specimen fixed and moving a light source which illuminates said specimen and an optical system mounted in a housing by the same distance in a vertical direction so that vertical dimensions can be read on a scale, said contour projector comprising in combination, a housing;
a first slidable member provided in said housing;
a guide formed on said housing for guiding the movement of said first slidable member in said vertical direction;
an objective lens supported by said first slidable member being reciprocately movable in said vertical direction, the principal point thereof being in alignment with the longitudinal direction of said guide, said objective lens collimating the light from said specimen;
a first reflection means supported on said first slidable member and arranged along the optical axis of the objective lens for reflecting parallel light rays transmitted therethrough and causing said parallel rays to be transmitted in said vertical direction, the first reflection means having two reflecting surfaces by which reflected light rays intersect the light rays incident on one of the surfaces;
a second slidable member mounted in said housing being slidable in said vertical direction by a distance of one-half of the sliding distance of said first slidable member;
second reflection means reflecting reversely and parallely the parallel light rays which are incident thereon by the reflection of said first reflection means;
a screen fixedly mounted on said housing; and
a projection lens fixed on said housing for projecting an image onto said fixed screen.

References Cited
UNITED STATES PATENTS

| | | | |
|---|---|---|---|
| 3,088,368 | 5/1963 | Tripp et al. | 350—202 |
| 3,311,019 | 3/1967 | Valikov et al. | 356—164 |
| 3,099,185 | 7/1963 | Meltzer | 356—164 |

RONALD L. WIBERT, Primary Examiner

E. S. BAUER, Assistant Examiner

U.S. Cl. X.R.

353—99